(12) United States Patent
Nakashima

(10) Patent No.: US 10,468,029 B2
(45) Date of Patent: Nov. 5, 2019

(54) COMMUNICATION TERMINAL, COMMUNICATION METHOD, AND COMPUTER PROGRAM PRODUCT

(71) Applicant: Akihiro Nakashima, Kanagawa (JP)

(72) Inventor: Akihiro Nakashima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/900,913

(22) Filed: Feb. 21, 2018

(65) Prior Publication Data

US 2018/0268819 A1 Sep. 20, 2018

(30) Foreign Application Priority Data

Mar. 14, 2017 (JP) ................. 2017-048205

(51) Int. Cl.
*G10L 15/26* (2006.01)

(52) U.S. Cl.
CPC .................... *G10L 15/26* (2013.01)

(58) Field of Classification Search
CPC ...................................... G10L 15/26
USPC ............................................... 704/235
See application file for complete search history.

(56) References Cited

U.S. PATENT DOCUMENTS

| | | | | |
|---|---|---|---|---|
| 5,717,663 A * | 2/1998 | Fujita | ................. | G11B 27/034 369/52.1 |
| 5,920,025 A * | 7/1999 | Itoh | ................. | G10H 1/36 84/611 |
| 2005/0192796 A1 * | 9/2005 | Park | ................. | G10L 19/04 704/211 |
| 2006/0149558 A1 * | 7/2006 | Kahn | ................. | G10L 15/063 704/278 |
| 2009/0037171 A1 * | 2/2009 | McFarland | ............. | G10L 15/26 704/235 |
| 2010/0063815 A1 * | 3/2010 | Cloran | ................. | G06Q 10/10 704/235 |
| 2011/0267419 A1 * | 11/2011 | Quinn | ................. | H04N 7/15 348/14.08 |
| 2012/0197770 A1 * | 8/2012 | Raheja | ................. | G06F 17/2258 705/30 |
| 2013/0066631 A1 * | 3/2013 | Wu | ................. | G10L 13/08 704/258 |
| 2013/0177143 A1 * | 7/2013 | Zhou | ................. | H04M 11/10 379/88.14 |
| 2013/0311186 A1 * | 11/2013 | Lee | ................. | G10L 15/26 704/260 |
| 2014/0119558 A1 * | 5/2014 | Goldstein | ............. | H04M 1/05 381/74 |

(Continued)

FOREIGN PATENT DOCUMENTS

JP 2011-182125 9/2011

*Primary Examiner* — Jakieda R Jackson
(74) *Attorney, Agent, or Firm* — Harness, Dickey & Pierce, P.L.C.

(57) ABSTRACT

A communication terminal includes circuitry. The circuitry receives audio data collected by an audio collecting device, and transmits the audio data to a speech recognition apparatus via a network. The circuitry further receives text data, which is a result of speech recognition of the audio data, from the speech recognition apparatus, reproduces the audio data, and displays the text data on a display device during a period in which the audio data is being reproduced.

5 Claims, 12 Drawing Sheets

(56) References Cited

U.S. PATENT DOCUMENTS

| | | | | |
|---|---|---|---|---|
| 2014/0123178 | A1* | 5/2014 | Burkitt | H04N 21/23424 |
| | | | | 725/34 |
| 2014/0188475 | A1* | 7/2014 | Lev-Tov | G10L 15/19 |
| | | | | 704/254 |
| 2014/0192138 | A1* | 7/2014 | Kenoyer | H04L 29/06027 |
| | | | | 348/14.07 |
| 2015/0066505 | A1* | 3/2015 | Baker | G10L 15/08 |
| | | | | 704/235 |
| 2015/0081291 | A1* | 3/2015 | Jeon | G06F 3/167 |
| | | | | 704/235 |
| 2015/0269952 | A1* | 9/2015 | Ojanpera | G10L 19/24 |
| | | | | 704/205 |
| 2016/0253995 | A1* | 9/2016 | Zhou | G10L 15/20 |
| | | | | 704/233 |
| 2017/0134446 | A1 | 5/2017 | Kitada et al. | |
| 2017/0336960 | A1* | 11/2017 | Chaudhri | G06F 3/04817 |

\* cited by examiner

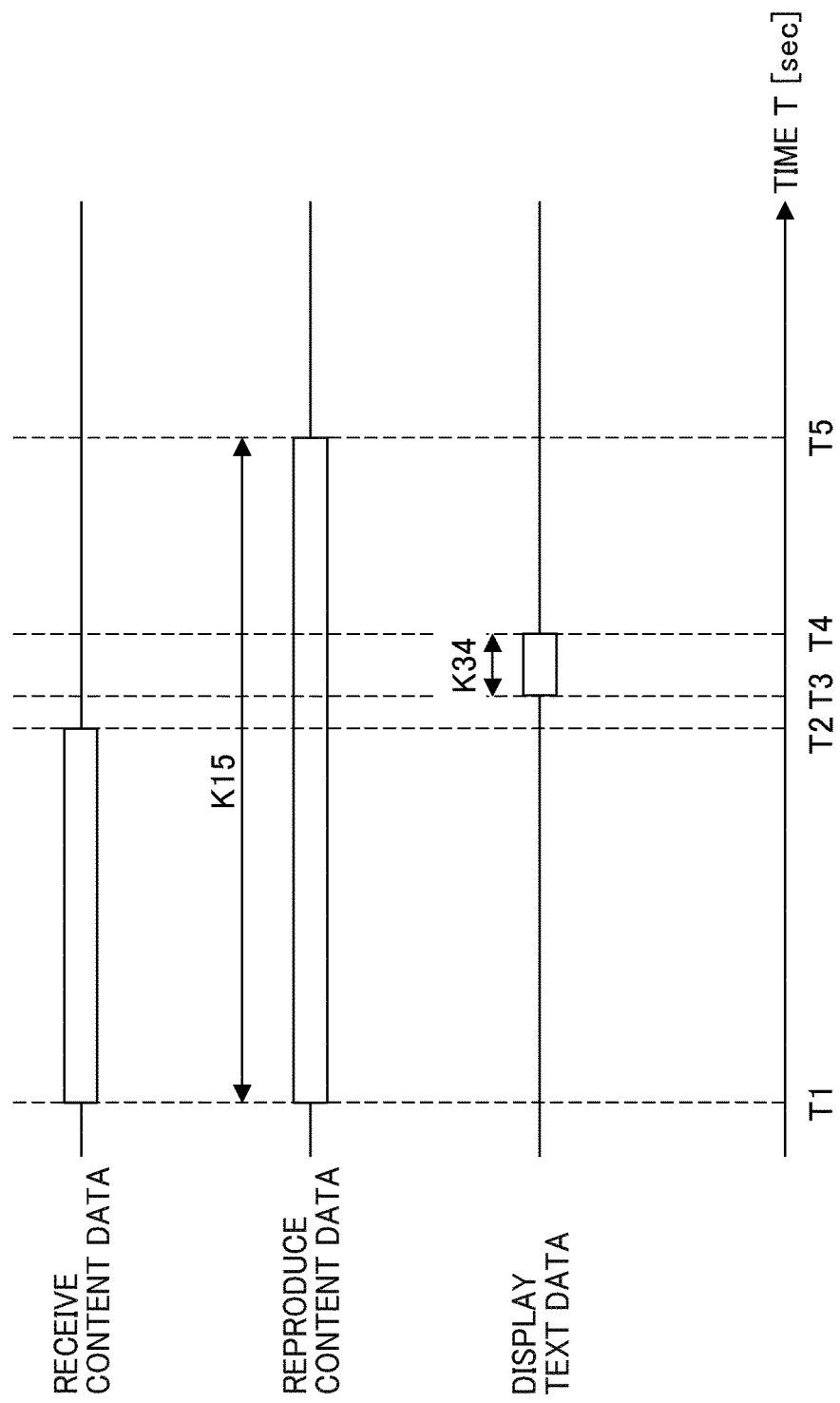

COMMUNICATION TERMINAL, COMMUNICATION METHOD, AND COMPUTER PROGRAM PRODUCT

CROSS-REFERENCE TO RELATED APPLICATION

This patent application is based on and claims priority pursuant to 35 U.S.C. § 119(a) to Japanese Patent Application No. 2017-048205, filed on Mar. 14, 2017, in the Japan Patent Office, the entire disclosure of which is hereby incorporated by reference herein.

BACKGROUND

Technical Field

The present disclosure relates to a communication terminal, a communication method, and a computer program product.

Description of the Related Art

A speech recognition service is known, which converts audio data to text data. Further, a technology to display text data corresponding to speech by using such speech recognition service is now in widespread use.

For example, when this technology is applied to a videoconference system, voice data of voices of a speaker is converted into text data by the speech recognition service, and the text data corresponding to the voice data of the speaker is displayed on a display used by a listener.

In conventional videoconference systems, audio data is first input, and the input audio data is sent to the speech recognition service for conversion to text data. In this case, a time lag occurs between the timing when the audio data is reproduced and the timing when the text data is displayed.

SUMMARY

A communication terminal includes circuitry. The circuitry receives audio data collected by an audio collecting device, and transmits the audio data to a speech recognition apparatus via a network. The circuitry further receives text data, which is a result of speech recognition of the audio data, from the speech recognition apparatus, reproduces the audio data, and displays the text data on a display device during a period in which the audio data is being reproduced.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 12 is an illustration for explaining an operation performed by the communication terminal according to another embodiment of the present disclosure.

Figure 1:
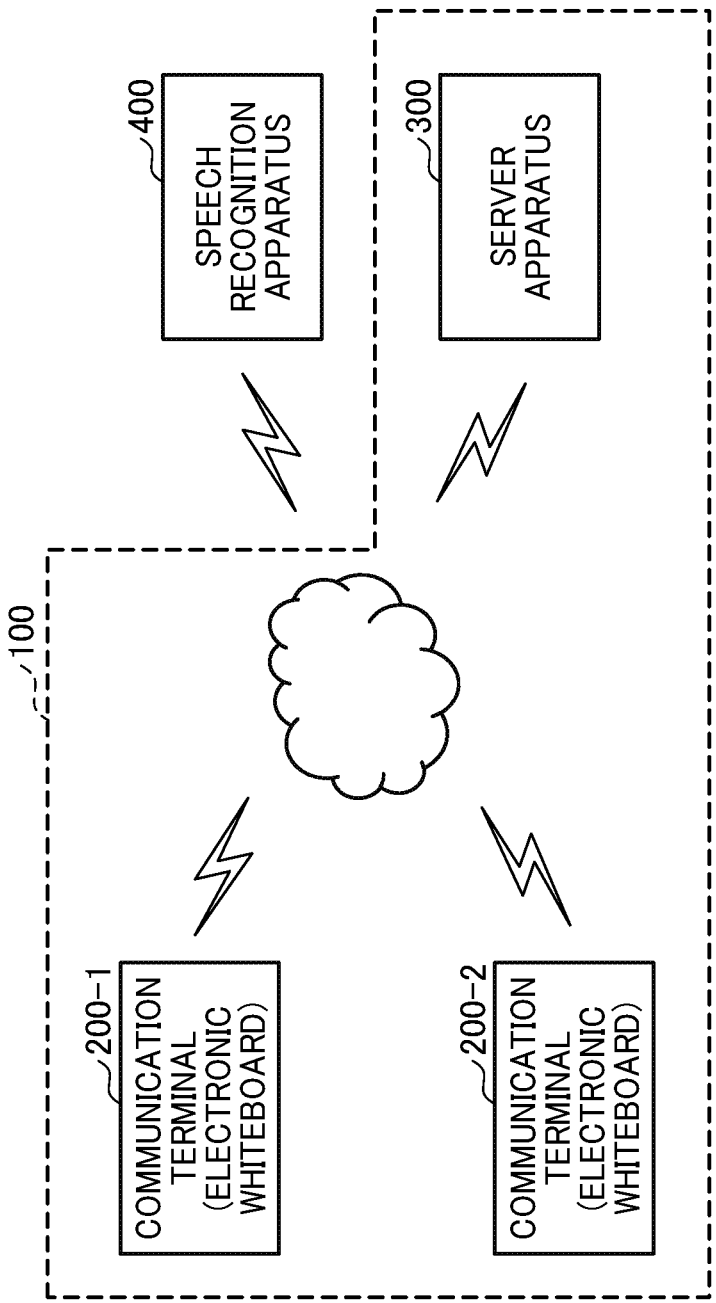
FIG. 1 is a schematic view illustrating a configuration of a communication system according to an embodiment of present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Referring to the drawings, embodiments of the present invention are described.

Embodiment 1

Hereinafter, a description is given of a first embodiment of the present disclosure with reference drawings. FIG. 1 is a schematic view illustrating a configuration of a communication system 100.

The communication system 100 according to the present embodiment includes a communication terminal 200-1, a communication terminal 200-2, and a server apparatus 300. In the communication system 100, the communication terminal 200-1, the communication terminal 200-2, and the server apparatus 300 are connected to each other via a network N. In addition, the communication system 100 according to the present embodiment is connected to a speech recognition apparatus 400 that converts audio data into text data, via the network N.

In the communication system 100 according to the present embodiment, examples of the communication terminal 200-1 and 200-2 include an electronic whiteboard.

Examples of the server apparatus 300 include a server apparatus for videoconferencing that implements a videoconference. In the following description, arbitrary one of the communication terminal 200-1 and the communication terminal 200-2 is referred to as a "communication terminal 200", unless they have to be distinguished.

The communication terminal 200 according to the present embodiment includes an audio collecting device such as a microphone, and transmits audio data collected by the audio collecting device to the server apparatus 300 and the speech recognition apparatus 400. Further, the communication terminal 200 according to the present embodiment transmits stroke information indicating handwritten characters and drawn images, image data obtained by capturing a screen, etc., to the server apparatus 300. Furthermore, the communication terminal 200 according to the present embodiment includes an imaging device such as a camera, and transmits image data captured by the imaging device to the server apparatus 300.

The speech recognition apparatus 400 according to the present embodiment is, for example, a service that is provided by artificial intelligence. The speech recognition apparatus 400 converts the received audio data into text data by a speech recognition function, and transmits the text data to the server apparatus 300. It should be noted that the audio data according to the present embodiment is data of all sounds collected by the audio collecting device, such as voice of a person who speaks near the communication terminal 200 and various sounds other than human voice. In other words, in the present embodiment, speech data indicating the voice of a person who speaks near the communication terminal 200 is a part of the audio data.

The server apparatus 300 according to the present embodiment stores the received stroke information, image data, audio data, etc. In addition, the server apparatus 300 according to the present embodiment stores the text data transmitted from the speech recognition apparatus 400 in association with the audio data. In the following description, various data transmitted from the communication terminal 200 to the server apparatus 300 is referred to as content data. In other words, the content data according to the present embodiment includes the audio data, the image data, the stroke information, etc.

Further, for example, when the communication terminal 200 is used at a certain meeting, the server apparatus 300 according to the present embodiment may store a name of the meeting, the content data acquired during the meeting, and the text data converted from the audio data in association with each other. In other words, in the server apparatus 300, the content data acquired from the communication terminal 200 may be stored for each conference.

In the communication system 100 according to the present embodiment, a videoconference is held between a user of the communication terminal 200-1 and a user of the communication terminal 200-2, for example. In this case, the server apparatus 300 displays information that is input from each of the communication terminal 200-1 and the communication terminal 200-2 on a screen of each of the communication terminal 200-1 and the communication terminal 200-2 to enable information sharing.

More specifically, in the communication system 100, one of the communication terminals 200-1 and 200-2 transmits the image data and audio data captured and collected by the one of the communication terminals 200-1 and 200-2 to the other one of the communication terminals 200-1 and 200-2 via the server apparatus 300.

In response to receiving the image data and the audio data from the server apparatus 300, the other one of communication terminal 200-1 and communication terminal 200-2 displays the received image data on a display device and reproduces the received audio data. Further, the other one of communication terminal 200-1 and communication terminal 200-2 transmits the received audio data to the speech recognition apparatus 400 to obtain text data, and displays the text data on the display device.

According to the present embodiment, the communication terminal 200 displays text data obtained by performing speech recognition on the audio data received from the server apparatus 300, during a period of time when the communication terminal 200 is producing the corresponding audio data.

In the present embodiment, this operation enables audio data to be reproduced and text data to be displayed to correspond to each other in the communication terminal 200.

Although in FIG. 1, the communication terminal 200 is implemented by an electronic whiteboard, the electronic whiteboard is just an example. The communication terminal 200 according to the present embodiment could be any other suitable terminal, provided that it includes an audio collecting device and a display device and is capable of communicating with an external apparatus such as the server apparatus 300 or the speech recognition apparatus 400. Specifically, examples of the communication terminal 200 according to the present embodiment include a general-purpose computer, a tablet terminal, and a smartphone. In addition, the present embodiment can be applied to other various electronic devices.

Figure 2:
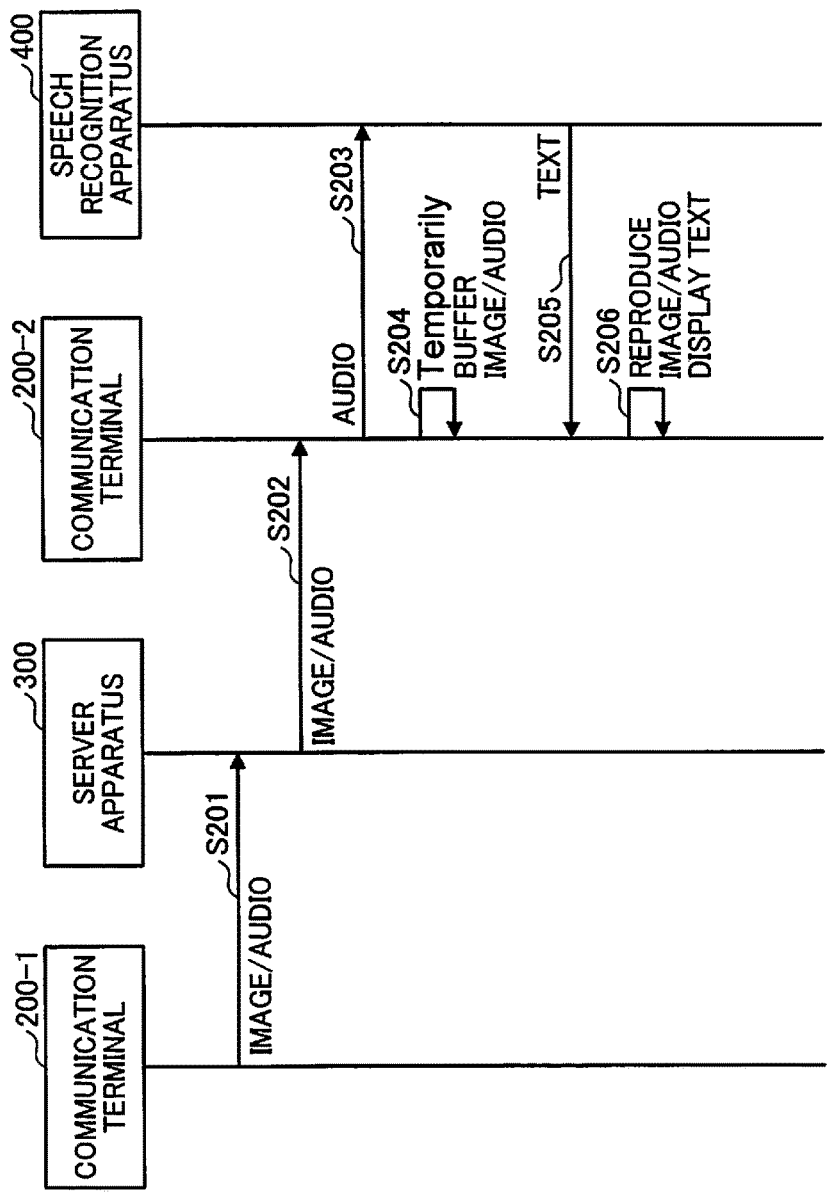
FIG. 2 is a sequence diagram illustrating an overview of an operation performed by the communication system according to an embodiment of present disclosure.

Hereinafter, a description is given of steps in an operation performed by the communication system 100 according to the present embodiment, with reference to FIG. 2 and FIG. 3. FIG. 2 is a sequence diagram illustrating an overview of the operation performed by the communication system 100 according to the first embodiment.

In the communication system 100 according to the present embodiment, the communication terminal 200-1 transmits image data captured by the imaging device and sound data collected by the audio collecting device to the server apparatus 300 (S201). The server apparatus 300 transmits the received image data and audio data to the communication terminal 200-2 (S202).

In response to receiving the image data and audio data, the communication terminal 200-2 transmits the audio data to the speech recognition apparatus 400 (S203). In addition, the communication terminal 200-2 temporarily stores the received image data and voice data (S204).

Next, the communication terminal 200-2 receives, from the speech recognition apparatus 400, text data, which is a speech recognition result of the audio data transmitted at S203 (S205). The communication terminal 202-2 reproduces the image data and audio data that are temporarily stored at S204, and displays the text data received at S205 (S206).

As described above, the communication terminal 200 according to the present embodiment waits to reproduce the received audio data until obtaining the text data as the speech recognition result of the received audio data.

Hereinafter, a description is given of steps in an operation performed by a communication system to which the present embodiment is not applied, with reference to FIG. 3. FIG. 3 is a sequence diagram illustrating an overview of the operation performed by the communication system according to a comparative example.

Figure 3:
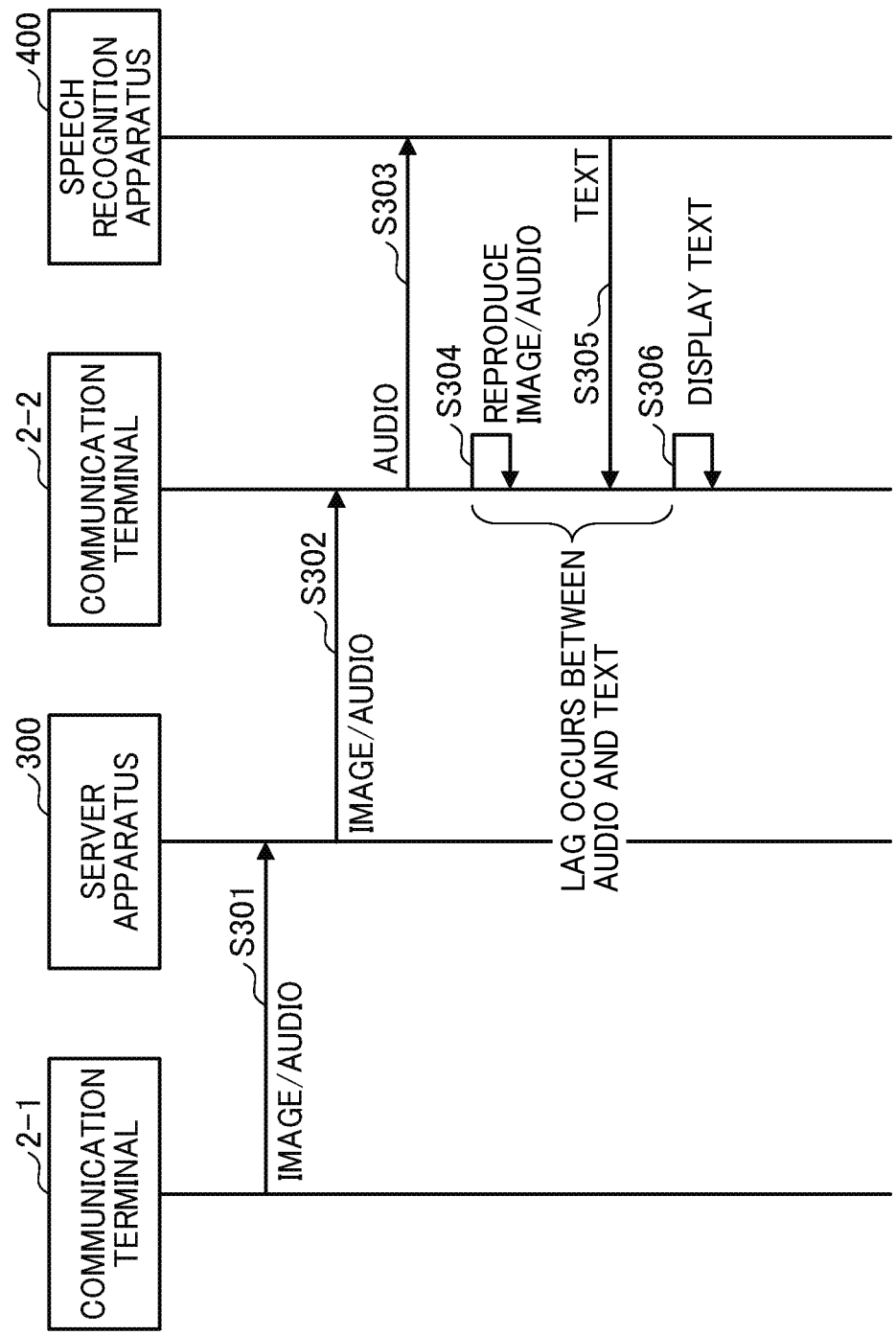
FIG. 3 is a sequence diagram illustrating an overview of an operation performed by a communication system according to a comparative example.

Since operation of S301 to S303 of FIG. 3 is performed in substantially the similar manner as described above referring to S201 to S203 of FIG. 2, the description thereof is omitted.

After transmitting audio data to the speech recognition apparatus 400 at S303, the communication terminal 2-2 reproduces image data and audio data received from the server apparatus 300 (S304). Subsequently, the communication terminal 2-2 receives text data from the speech recognition apparatus 400 (S305), and displays the received text data on a display device (S306).

As described in the comparative example of FIG. 3, once receiving the audio data, the communication terminal 2-2 starts reproducing the received audio data before the conversion of the audio data into text data. Therefore, in the comparative example of FIG. 3, there is a possibility that the reproduction of the audio data ends before the text data is received and displayed. In this case, text data displayed on the display device of the communication terminal 2-2 corresponds to the audio data of which reproduction has already finished. As a result, in the comparative example of FIG. 3, the audio data being reproduced and text data being displayed do not correspond to each other.

By contrast, as illustrated in FIG. 2, the communication terminal 200-2 according to the present embodiment suspends the reproduction of the audio data after receiving the audio data, until the communication terminal 200-2 receives the text data, which is a speech recognition result of this audio data. The communication terminal 200-2 reproduces the audio data and displays the text data, after receiving the text data. Therefore, according to the present embodiment, it is possible to reproduce audio data while displaying text data, which is the speech recognition result of this audio data. This enables the audio data and the text data to correspond to each other.

Figure 4:
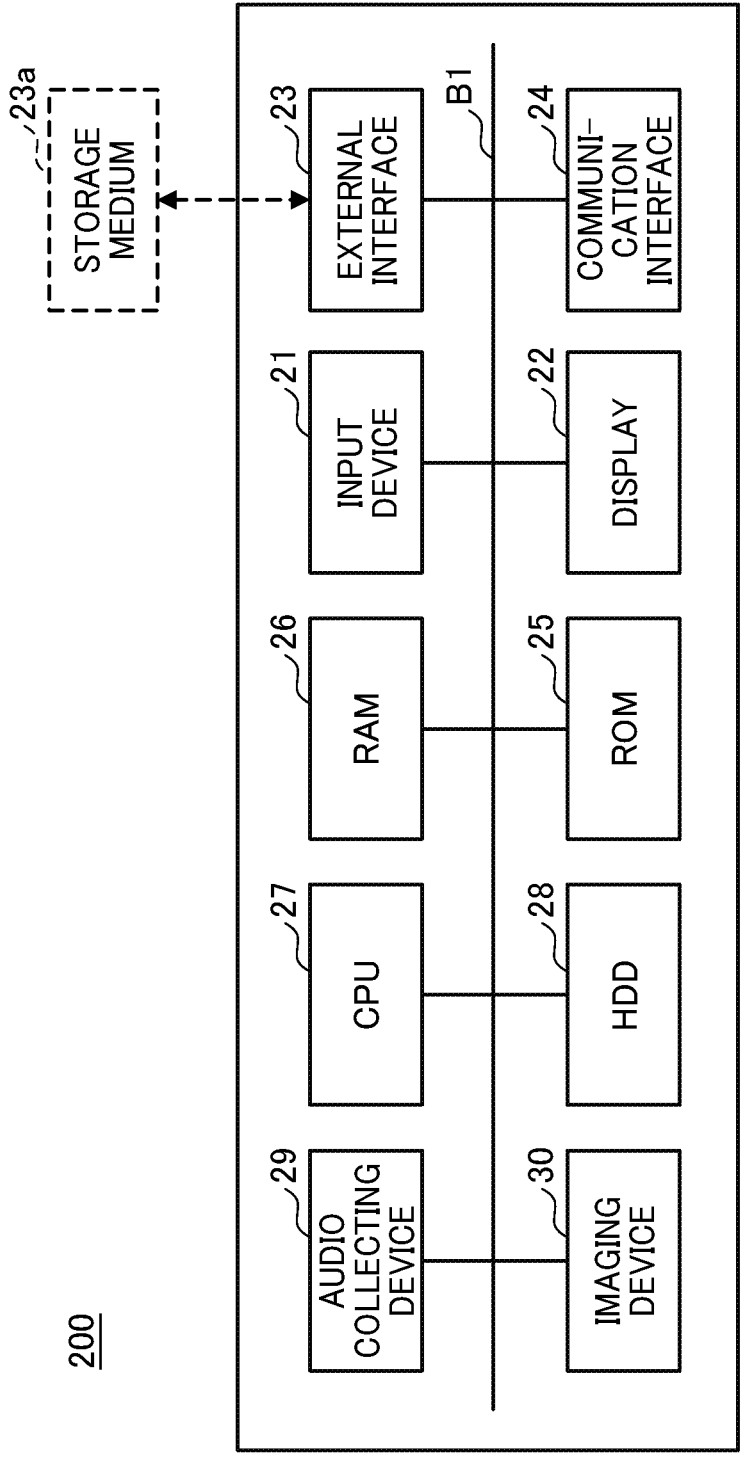
FIG. 4 is a block diagram illustrating an example hardware configuration of a communication terminal according to an embodiment of present disclosure.

Hereinafter, a description is given of the communication terminal 200 according to the present embodiment. FIG. 4 is a block diagram illustrating an example hardware configuration of the communication terminal 200 according to the first embodiment.

The communication terminal 200 according to the present embodiment includes an input device 21, a display device 22, an external interface 23, a communication interface 24, and a read only memory (ROM) 25. Further, the communication terminal 200 according to the present embodiment includes a random access memory (RAM) 26, a central processing unit (CPU) 27, a hard disc drive (HDD) 28, an audio collecting device 29, and an imaging device 30. These hardware devices are connected to one another via a bus B1.

Examples of the input device 21 include a touch panel, enabling an input of various operation instructions by a user, such as operation instruction for selecting a function such as speech-text conversion (Japanese) or speech-text conversion (English). Examples of the display device 22 include a display, on which various kinds of information is displayed, such as text indicating a conversion result of speech-text conversion or audio data. In the present embodiment, the input device 21 and the display device 22 may be implemented in a unit by a touch panel.

The external interface 23 is an interface with an external device. Examples of the external device include a storage medium 23a. The external interface 23 enables the communication terminal 200 to read or write data from or to the storage medium 23a. Examples of the storage medium 23a include a universal serial bus (USB) memory, a compact disc (CD), a digital versatile disc (DVD), and an SD memory card.

The communication interface 24 is an interface that connects the communication terminal 200 to the network N, for example. The communication terminal 200 communicates with other apparatus via the communication interface 24.

The HDD 28 is a nonvolatile storage device that stores programs or data. Examples of the programs or data stored in the HDD 28 include an operating system (OS) for controlling an entire operation of the communication terminal 200 and an application program providing various functions on the OS.

The HDD 28 manages the programs or data stored therein by a predetermined file system and/or a predetermined database (DB). The communication terminal 200 may include, in alternative to the HDD 28, a drive device such as a solid state drive (SSD) that uses a flash memory as a storage medium.

The ROM 25 is a nonvolatile semiconductor memory, which holds programs or data even after the communication terminal 200 is turned off as the power is not supplied. The ROM 25 stores programs and data such as a Basic Input/Output System (BIOS), which is executed when the communication terminal 200 is started up, OS settings, and network settings. The RAM 26 is a volatile semiconductor memory, which holds programs or data temporarily.

The CPU 27 reads programs or data from a storage device such as the ROM 25 and the HDD 28 onto the RAM 26, and executes processing to implement the entire control of the communication terminal 200 or functions of the communication terminal 200.

Examples of the audio collecting device 29 include a microphone that collects sounds around the communication terminal 200.

Examples of the imaging device 30 include a camera that captures objects surrounding the communication terminal 200. For example, the imaging device 30 captures scenes of a meeting that is being performed using the communication terminal 200.

The communication terminal 200 according to the present embodiment implements processes as described later with the hardware configuration as illustrated in FIG. 2.

Figure 5:
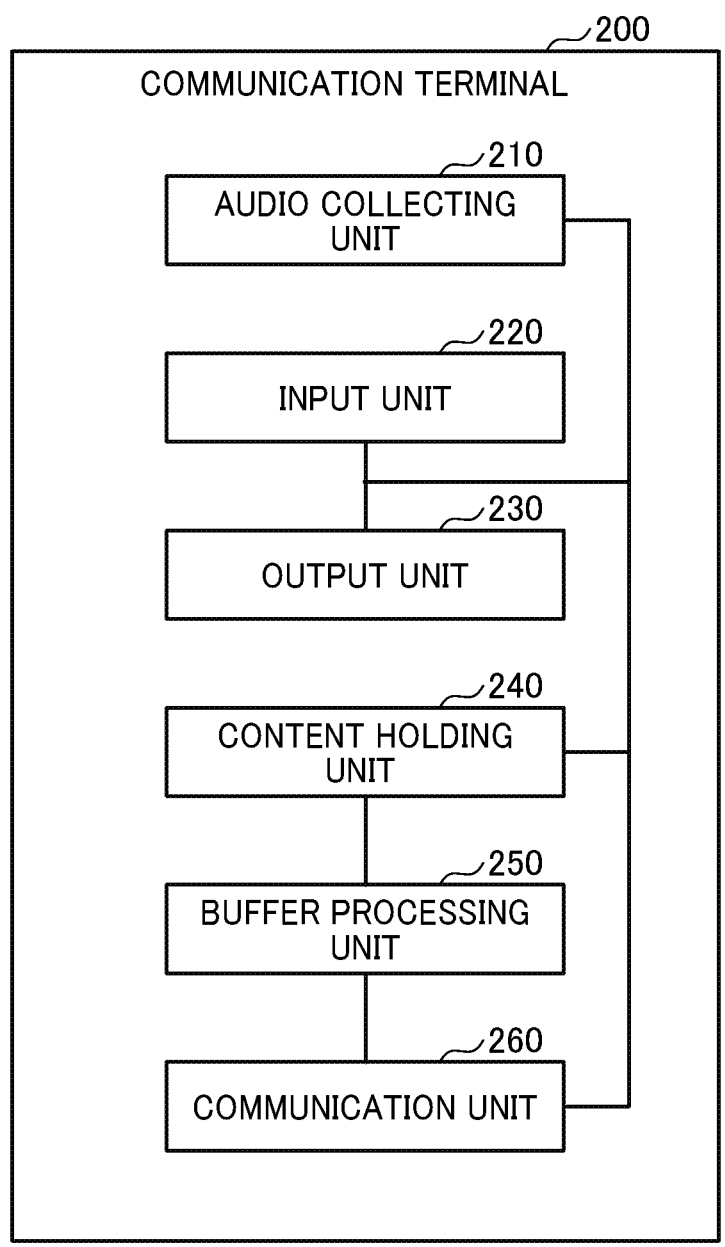
FIG. 5 is a block diagram illustrating functions of hardware devices of the communication terminal according to an embodiment of present disclosure.

Hereinafter, a description is given of an example of functions of the communication terminal 200 according to the present embodiment, with reference to FIG. 5. FIG. 5 is a block diagram illustrating functions of the hardware devices of the communication terminal 200 according to the first embodiment.

The functions of the communication terminal 200 according to the present embodiment are implemented by the CPU 27 executing the program read from the RAM 26, etc.

The communication terminal 200 according to the present embodiment includes an audio collecting unit 210, an input unit 220, an output unit 230, a content holding unit 240, a buffer processing unit 250, and a communication unit 260.

The audio collecting unit 210 obtains audio that is input to the audio collecting device 29 as audio data. The input unit 220 acquires stroke information indicating characters and images drawn on the touch panel (input device 21, display device 22) of the communication terminal 200, or image data of an image displayed on the touch panel. In this embodiment, the stroke information is coordinate information of a group of points that together form the trajectory of each stroke drawn by a user on the touch panel.

The input unit 220 acquires image data captured by the imaging device 30. It should be noted that, in this embodiment, the image data includes both video data and still image data.

The output unit 230 outputs the audio data and the image data. More specifically, the output unit 230 controls the display device 22 to display the image data or to reproduce the audio data, for example.

The content holding unit 240 temporarily stores the audio data according to an instruction from the buffer processing unit 250. For example, the content holding unit 240 according to the present embodiment may hold the content data that is received by the communication unit 260 from the server apparatus 300. In addition, the content holding unit 240 may hold the content data acquired by the audio collecting unit 210 and the input unit 220. Furthermore, the content holding unit 240 may hold only the audio data included in the content data.

When the audio data has been transmitted to the speech recognition apparatus 400, the buffer processing unit 250 controls the content holding unit 240 to hold the content data until the communication unit 260 receives text data as a speech recognition result from the speech recognition apparatus 400.

The communication unit 260 communicates data with the server apparatus 300 and the speech recognition apparatus 400. More specifically, the communication unit 260 transmits, to the server apparatus 300, the content data acquired by the audio collecting unit 210 and the input unit 220. In addition, the communication unit 260 transmits the audio data acquired by the audio collecting unit 210 to the speech recognition apparatus 400, and receives the text data as a speech recognition result. Further, the communication unit 260 receives the content data transmitted from a counterpart communication terminal 200 via the server apparatus 300.

Figure 6:
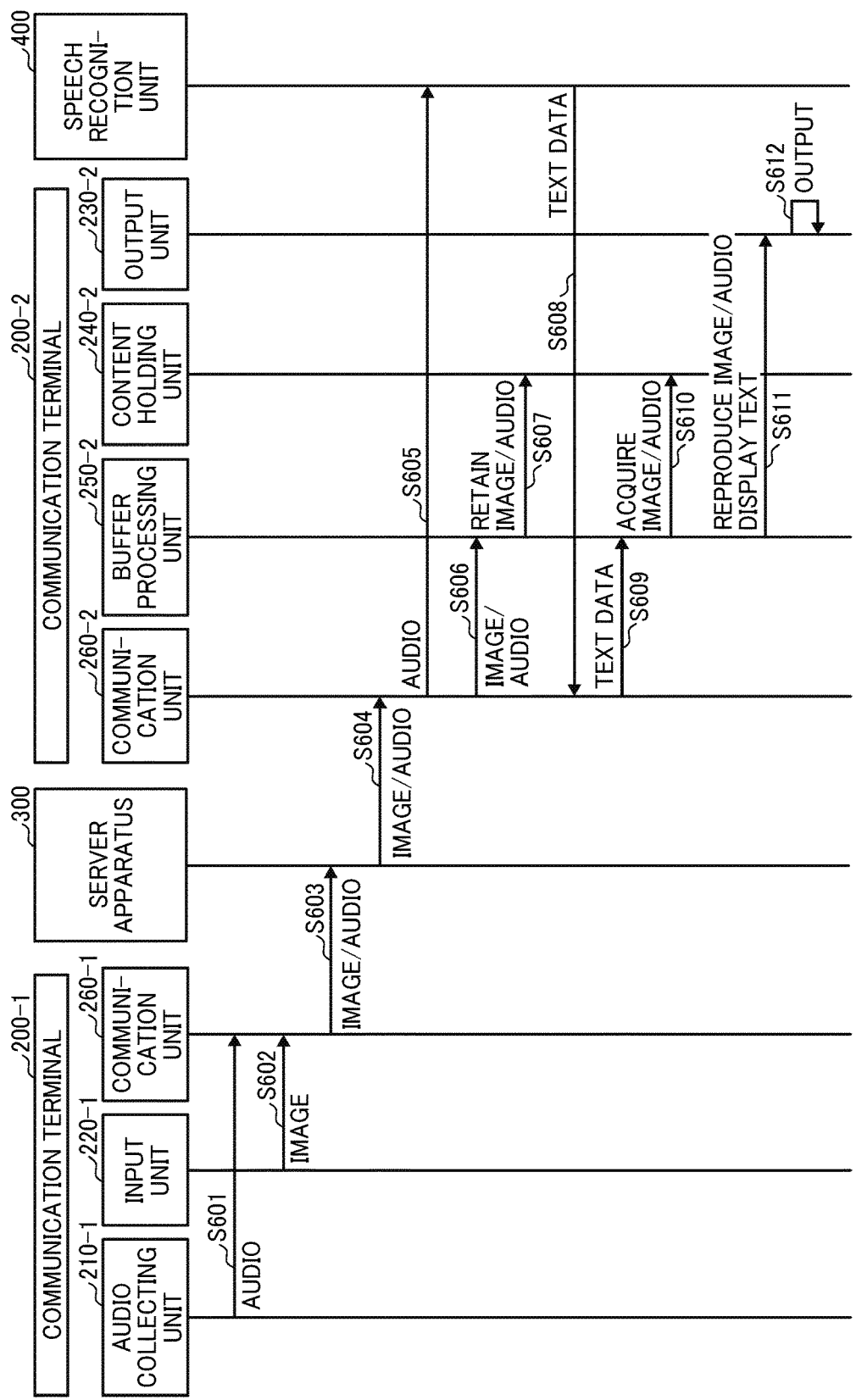
FIG. 6 is a sequence diagram illustrating an operation performed by the communication system according to an embodiment of present disclosure.

Hereinafter, a description is given of steps in an operation performed by the communication system 100 according to the present embodiment, with reference to FIG. 6. FIG. 6 is a sequence diagram illustrating an operation performed by the communication system 100 according to the first embodiment.

FIG. 6 illustrates an example operation in which the communication terminal 200-2 receives content data acquired by the communication terminal 200-1 via the server apparatus 300.

In the communication system 100 according to the present embodiment, the communication terminal 200-1 acquires audio data by the audio collecting unit 210-1, and passes the acquired audio data to the communication unit 260-1 (S601). Further, the communication terminal 200-1 acquires image data by the input unit 220-2, and passes the acquired image data to the communication unit 260-1 (S602). The communication unit 260-1 of the communication terminal 200-1 transmits content data including the audio data and the image data to the server apparatus 300 (S603).

The server apparatus 300 transmits this content data to the communication terminal 200-2 (S604).

In response to receiving the content data, the communication terminal 200-2 transmits the audio data included in the content data to the speech recognition apparatus 400 by the communication unit 260-2 (S605). Further, the communication unit 260-2 passes the content data to the buffer processing unit 250 (S606).

In response to receiving the content data, the buffer processing unit 250-2 controls the content holding unit 240-2 to hold the content data (S607).

Subsequently, the communication terminal 200-2 receives, from the speech recognition apparatus 400, the text data as a speech recognition result of the audio data transmitted at S605 at the communication unit 260-2 (S608).

Subsequently, the communication unit 260-2 passes the received text data to the buffer processing unit 250-2 (S609). In response to receiving the text data, the buffer processing unit 250-2 obtains the content data from the content holding unit 240-2 (610).

Next, the buffer processing unit 250-2 passes the content data and the text data to the output unit 230-2 (S611). The output unit 230-2 simultaneously outputs the content data and the text data (S612).

Figure 7:
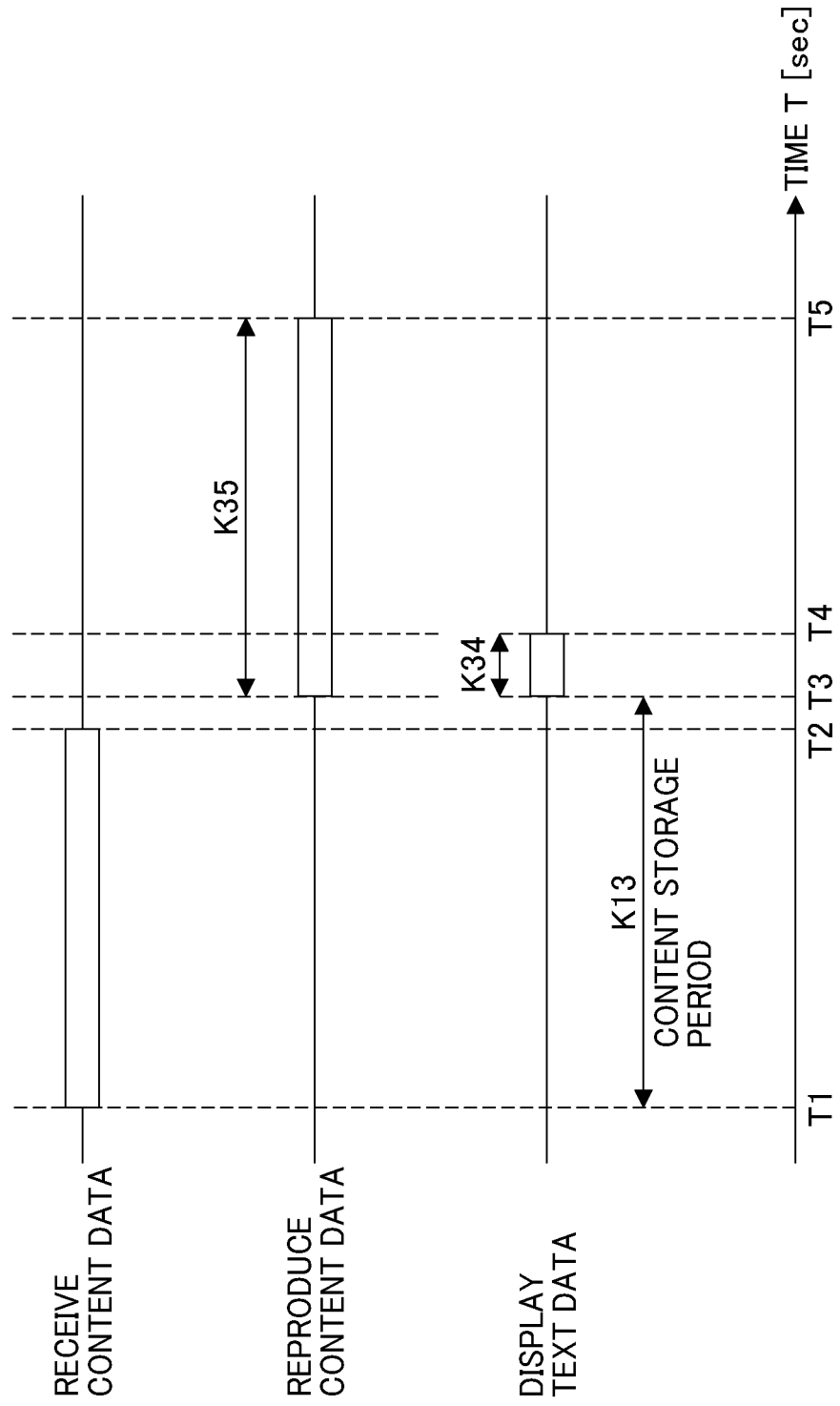
FIG. 7 is an illustration for explaining an operation performed by the communication terminal according to an embodiment of present disclosure.

Hereinafter, a description is given more specifically of the operation performed by the communication terminal 200 according to this embodiment, with reference to FIG. 7. FIG. 7 is an illustration for explaining an operation performed by the communication terminal 200 according to the first embodiment.

In an example of FIG. 7, the communication terminal 200-2 according to the present embodiment starts receiving the content data from the server apparatus 300 at a timing T1, and finishes receiving the content data at a timing T2.

In this case, the communication terminal 200-2 does not reproduce the content data immediately after starting the reception of the content data at the timing T1. Accordingly, the buffer processing unit 250-2 controls the content holding unit 240-2 to hold the content data.

Upon completion of receiving the content data at the timing T2 and completion of receiving the text data at a timing T3, the communication terminal 200-2 starts reproducing the content data and displaying the text data at the same time. Accordingly, in the present embodiment, a time period K13 from the timing T1 to the timing T3 is a content holding period during which the content holding unit 240-2 holds the content data.

Therefore, during a time period from the timing T1 to the timing T3, the communication terminal 200-2 transmits the audio data included in the content data to the speech recognition apparatus 400, and receives the text data as a speech recognition result. In the present embodiment, the communication terminal 200-2 may start transmitting the audio data to the speech recognition apparatus 400 after completion of receiving the content data at the timing T2. Alternatively, the communication terminal 200-2 may start transmitting the audio data to the speech recognition apparatus 400 from when the communication terminal 200-2 starts receiving the content data at the timing T1.

In the example of FIG. 7, the reproduction time of content data is a time period K35 from the timing T3 to a timing T5. In addition, the display time of text data is a time period K34 from the timing T3 to the timing T4.

Therefore, the communication terminal 200 according to the present embodiment is able to display the text data corresponding to the audio data on the display device 22 while the content data including this audio data is being reproduced.

As described above, according to the present embodiment, it is possible to make the audio data being reproduced and the text data being displayed correspond to each other. This prevents a listener from feeling strange. Further, according to the present embodiment, the text data is displayed during the reproduction of audio data. This helps the understanding of the content of text data.

Figure 8:
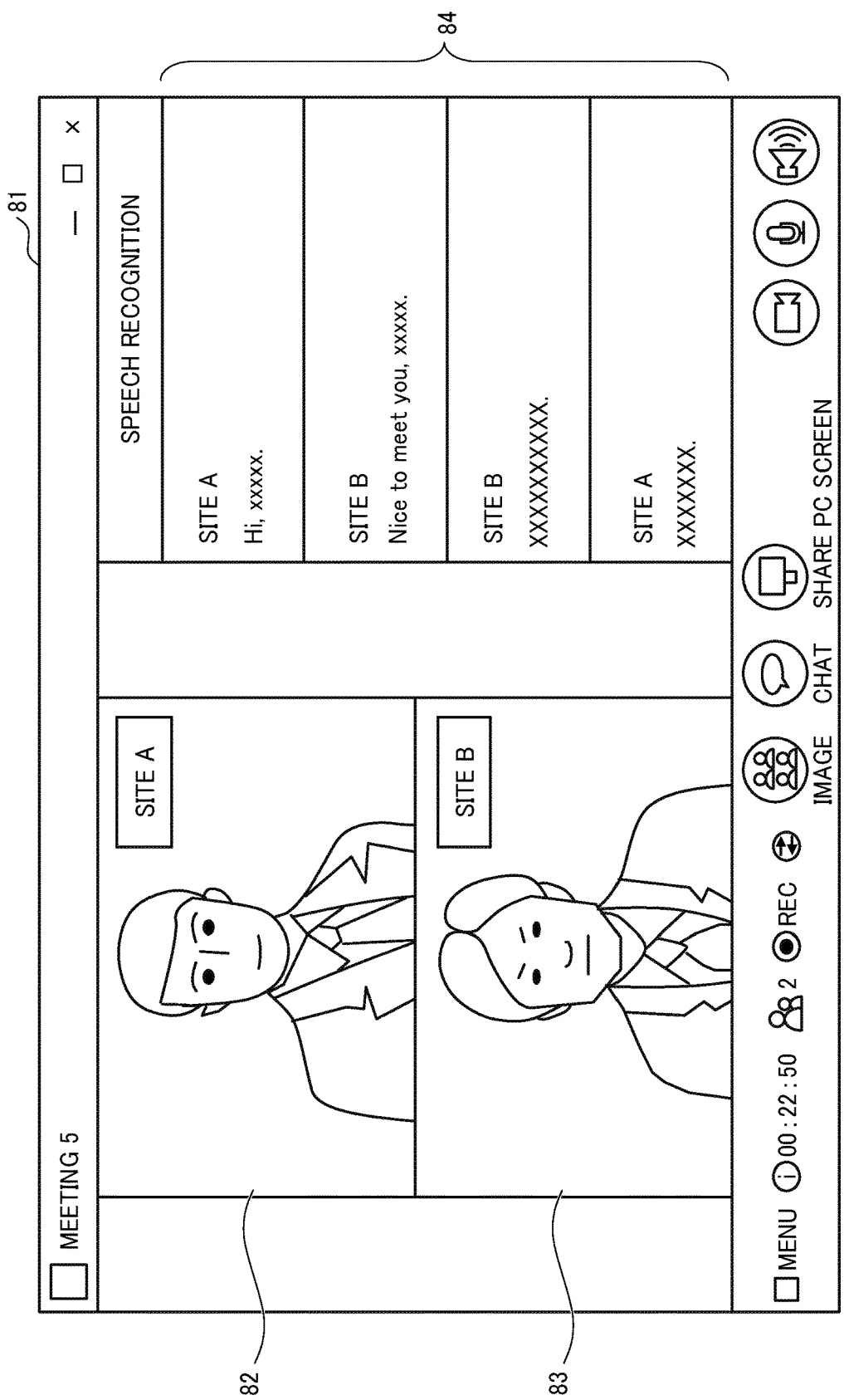
FIG. 8 is a diagram illustrating a display example on a display device of the communication terminal according to an embodiment of present disclosure.

FIG. 8 is a diagram illustrating a display example on the display device of the communication terminal 200 according to the first embodiment. A screen 81 illustrated in FIG. 8 is an example of a screen displayed on each of the display devices 22 of the communication terminal 200-1 and the communication terminal 200-2, when a videoconference is performed using the communication terminal 200-1 located at a site A and the communication terminal 200-2 located the site B, for example.

The screen 81 includes a display area 82 and a display area 83. In the display area 82, image data acquired by the input unit 220-1 of the communication terminal 200-1 is displayed. In the display area 83, image data acquired by the input unit 220-2 of the communication terminal 200-2 is displayed. Further, the screen 81 includes a display area 84, in which text data converted from the audio data acquired from each of the audio collecting unit 210-1 of the communication terminal 200-1 and the audio collecting unit 210-2 of the communication terminal 200-2 is displayed.

In the present embodiment, for example, during the period of time when the image data and the audio data of a user displayed in the display area 83 are being reproduced, the text data corresponding to this audio data is displayed in the display area 84. Therefore, according to the present embodiment, the text data indicating the contents of audio data is displayed during the reproduction of the audio data. Therefore, the present embodiment prevents a user viewing the screen 81 from feeling the difference between the timing of the reproduction of the audio data and the timing of the display of the text data. Accordingly, operability is improved.

A description is given heretofore mainly of the operation performed by the communication terminal 200-2. However, in the present embodiment, since the communication terminal 200-1 and the communication terminal 200-2 have the same or substantially the same configuration, the communication terminal 200-1 also performs the same or substantially the same operation as the communication terminal 200-2.

Embodiment 2

Hereinafter, a description is given of a second embodiment of the present disclosure with reference drawings. The second embodiment differs from the first embodiment in that processing is performed on audio data depending on a content holding period, which is a period of time from the reception of content data until the reproduction of audio data. Therefore, the description of the second embodiment is given of the differences from the first embodiment. The same reference numbers are allocated to the same functions or configurations as those of the first embodiment, and redundant descriptions thereof are omitted below.

Figure 9:
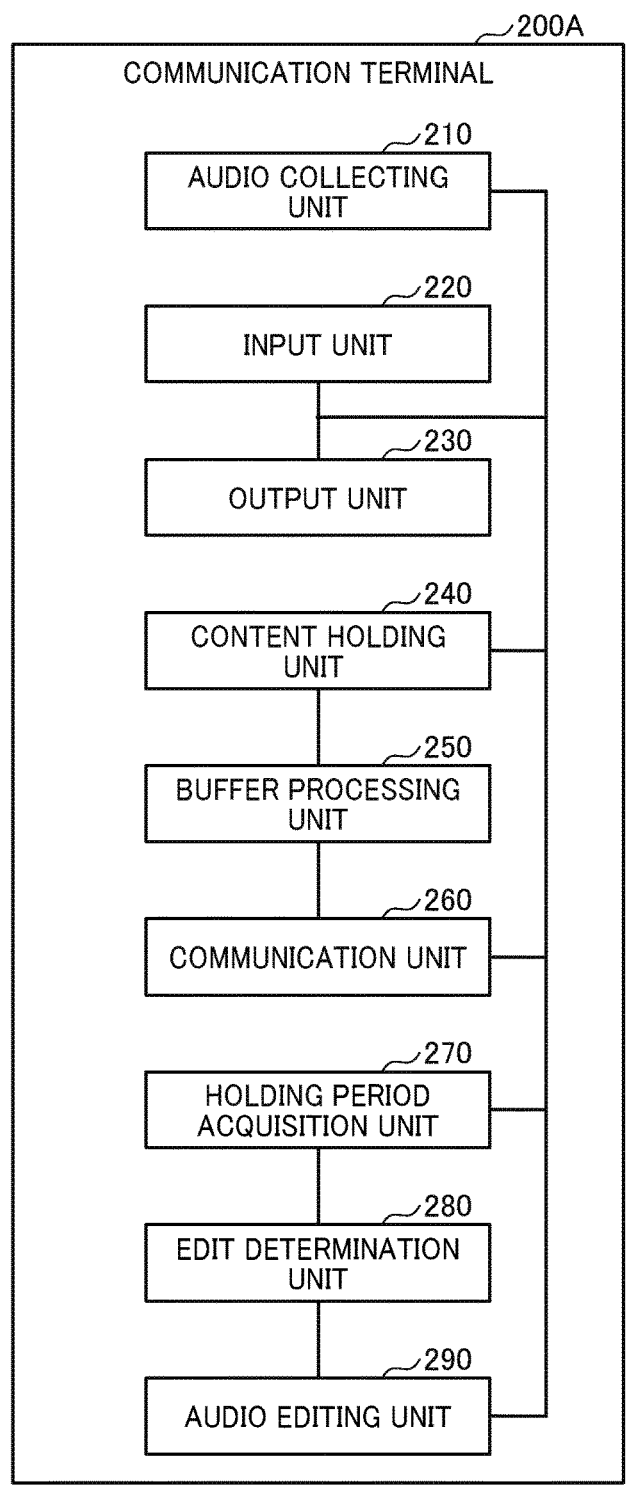
FIG. 9 is a block diagram illustrating functions of hardware devices of the communication terminal according to another embodiment of the present disclosure.

FIG. 9 is a block diagram illustrating functions of the hardware devices of the communication terminal 200A according to the second embodiment. The communication terminal 200A according to the present embodiment includes a holding period acquisition unit 270, an edit determination unit 280, and an audio editing unit 290, in addition to the functional units of the communication terminal 200 of the first embodiment.

The holding period acquisition unit 270 of the present embodiment calculates and obtains a content holding period, which is a period of time from when the communication unit 260 starts receiving content data until when the communication unit 260 receives the text data as a speech recognition result of the audio data included in the content data. Further, the holding period acquisition unit 270 stores the obtained content holding period.

The edit determination unit 280 determines, based on the content holding period, whether the audio data is to be edited. More specifically, the edit determination unit 280 determines whether or not the content holding period is a period longer than a predetermined period. When a determination result indicates that the content holding period is longer than the predetermined period, the edit determination unit 280 determines that the audio data is to be edited. Further, when the determination result indicates that the content holding period is within the predetermined period, the edit determination unit 280 determines that the content holding unit 240 is to hold the content data including the audio data without editing the audio data.

In the present embodiment, the predetermined period is, for example, an average of content holding periods for content data received in the past. In the present embodiment, for example, the edit determination unit 280 may calculate the average of the content holding periods each time the content holding period is stored by the holding period acquisition unit 270. In this case, the calculated average of the content holding periods is stored as the predetermined period.

When the content holding period that was stored by the holding period acquisition unit 270 at the time of previous reception of content data is longer than the predetermined period, the audio editing unit 290 performs processing on the audio data included in the content data to extend the audio data. More specifically, the audio editing unit 290 may edit a waveform, which is the audio data, to lengthen reproduction time of the audio data.

When the image data included in the content data is data of a still image, the audio editing unit 290 of the present embodiment may edit only the audio data. By contrast, when the image data included in the content data is video data, the audio editing unit 290 of the present embodiment performs processing similar to that performed on the audio data, on the video data.

For example, when the content data is video data and its frame rate is 30 fps, the audio editing unit 290 changes this frame rate to 15 fps to double the reproduction time of the content data.

Figure 10:
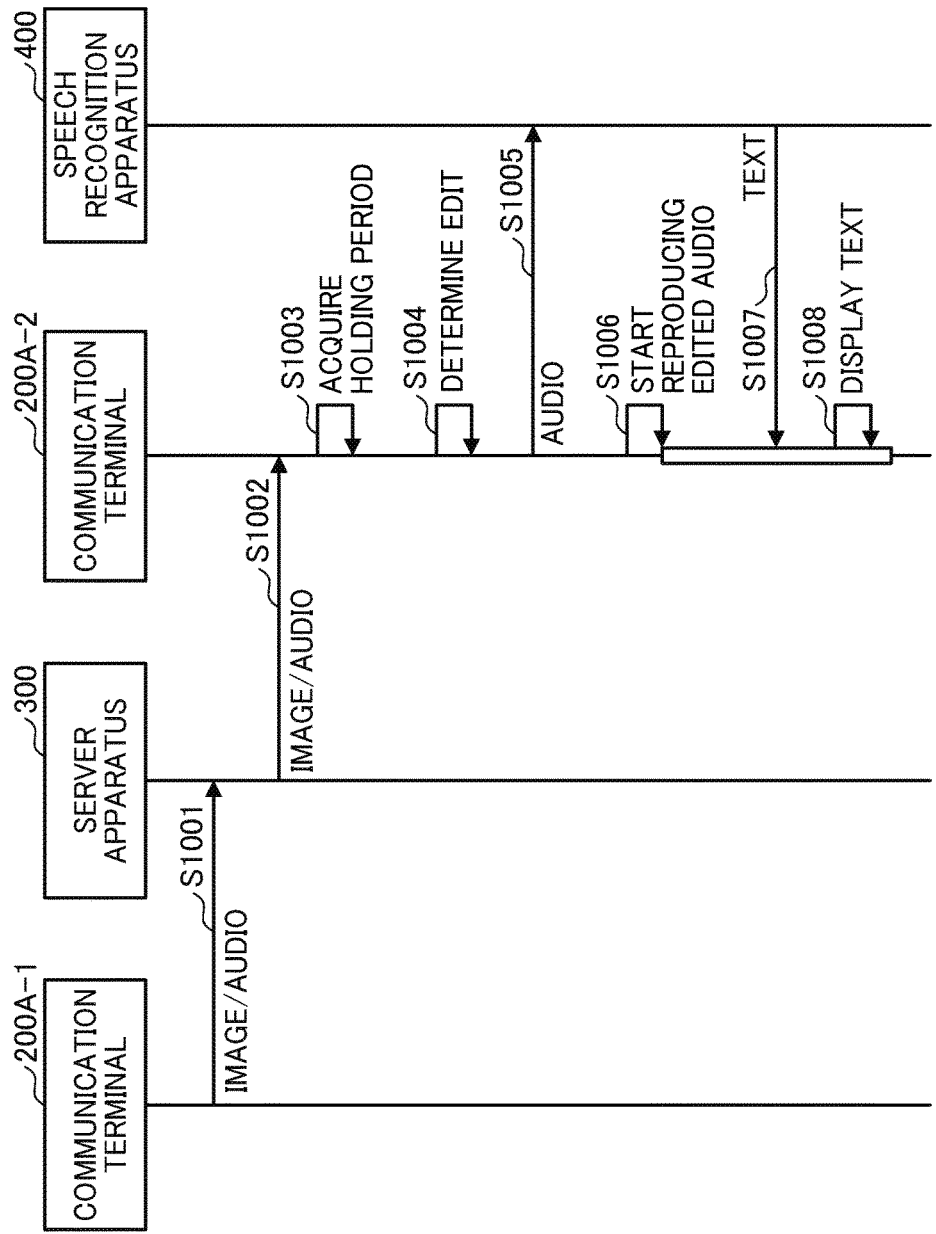
FIG. 10 is a sequence diagram illustrating an operation performed by the communication system according to another embodiment of the present disclosure.

Hereinafter, a description is given of steps in an operation performed by the communication system 100 according to the present embodiment, with reference to FIG. 10. FIG. 10 is a sequence diagram illustrating an operation performed by the communication system 100 according to the second embodiment.

The sequence diagram of FIG. 10 illustrates an example operation performed in a case in which the content holding period is longer than the predetermined period when the communication terminal 200A-2 receives the content data, which is transmitted from the communication terminal 200-1 to the server apparatus 300.

Operation of S1001 to S1002 of FIG. 10 is performed in substantially the similar manner as described above referring to S201 to S202 of FIG. 2, and the description thereof is omitted.

In response to receiving the content data at the communication unit 260-2, the holding period acquisition unit 270 of the communication terminal 200A-2 acquires a previously stored content holding period (S1003).

Next, when the edit determination unit 280 determines that the acquired content holding period is a period longer than the predetermined period, the communication terminal 200A-2 edits the audio data included in the content data by the audio editing unit 290 (S1004). In this case, the audio editing unit 290 edits the audio data so that the reproduction time of the edited audio data is longer than the content holding period.

Subsequently, the communication terminal 200A-2 transmits the audio data to the speech recognition apparatus 400

(S1005). Further, the communication terminal 200A-2 starts reproducing the edited audio data and image data (S1006).

Next, the communication terminal 200A-2 receives text data as a speech recognition result of the audio data from the speech recognition apparatus 400 (S1007). The communication terminal 200A-2 displays this text data on the display device 22 (S1008).

As described above, according to the present embodiment, the audio data is edited so that the reproduction time of the audio data is longer than the content holding period depending on the length of the content holding period. Therefore, the present embodiment enables to display the text data corresponding to the audio data while reproducing the edited audio data.

Figure 11:
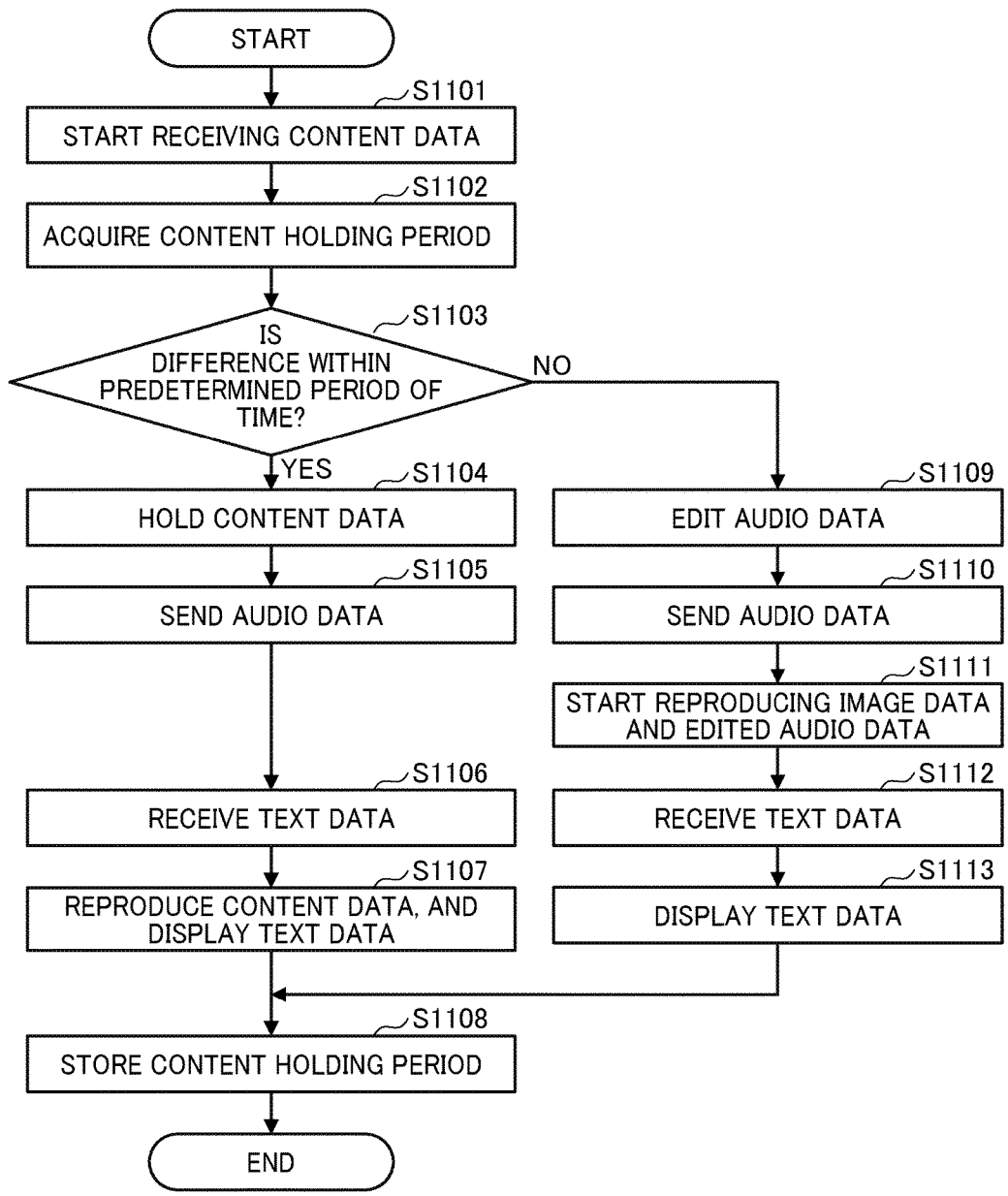
FIG. 11 is a flowchart illustrating steps in an operation performed by the communication terminal according to another embodiment of the present disclosure.

Hereinafter, a description is given of an overall operation performed by of the communication terminal 200A according to the present embodiment, with reference to FIG. 11. FIG. 11 is a flowchart illustrating steps in an operation performed by the communication terminal 200A according to the second embodiment. The communication terminal 200A according to the present embodiment performs the operation of FIG. 11 each time the communication terminal 200A receives content data.

When communication unit 260 of the communication terminal 200A according to the present embodiment starts receiving the content data (S1101), the holding period acquisition unit 270 acquires the content holding period stored in the previous reception of the content data (S1102).

Next, the edit determination unit 280 of the communication terminal 200A determines whether or not the content holding period acquired at S1102 is longer than the predetermined period (S1103). When a result of determination at S1103 indicates that the content holding period is longer than the predetermined period, the operation proceeds to S1109, which will be described later.

By contrast, when a result of determination at S1103 indicates that the content holding period is within the predetermined period, the buffer processing unit 250 of the communication terminal 200A controls the content holding unit 240 to store the content data (S1104). Subsequently, the communication unit 260 of the communication terminal 200A transmits the audio data to the speech recognition apparatus 400 (S1105). Then, the communication unit 260 receives the text data from the speech recognition apparatus 400 (S1106).

Subsequently, the output unit 230 of the communication terminal 200A reproduces the content data and displays the text data (S1107). Next, the holding period acquisition unit 270 of the communication terminal 200A obtains and stores the content holding period, which is a period of time from the start of reception of the content data at S1101 to the reception of the text data at S1106 (S1108). After S1108, the operation ends.

When a result of determination at S1103 indicates that the content holding period is longer than the predetermined period, the audio editing unit 290 of the communication terminal 200A edits the audio data so that the reproduction time of the edited audio data is longer than the content holding period (S1109).

Subsequently, the communication unit 260 of the communication terminal 200A transmits the unedited voice data to the speech recognition apparatus 400 (S1110). Further, the output unit 230 of the communication terminal 200A starts reproduction of the edited audio data and the image data included in the content data (S1111).

Subsequently, the communication unit 260 of the communication terminal 200A receives the text data from the speech recognition apparatus 400 (S1112). The output unit 230 controls the display device 22 to display the received text data (S1113). After S1113, the operation proceeds to S1108.

Hereinafter, a further description is given of the operation performed by the communication terminal 200A according to this embodiment, with reference to FIG. 12. FIG. 12 is an illustration for explaining an operation performed by the communication terminal 200A according to the second embodiment.

In an example of FIG. 12, the communication terminal 200A-2 according to the present embodiment starts receiving the content data from the server apparatus 300 at a timing T1, and finishes receiving the content data at a timing T2. Further, FIG. 12 illustrates an operation by the communication terminal 200A-2 in a case in which the content holding period stored by the holding period acquisition unit 270 of the 200A-2 is longer than the predetermined period.

In an example of FIG. 12, the communication terminal 200A-2 starts reproduction of the content data immediately after starting reception of content data at the timing T1, without holding the content data. In this case, the audio data included in the content data has been edited so that the reproduction time is longer than the content holding period.

In FIG. 12, the communication terminal 200A-2 finishes receiving the content data at the timing T2. Further, in response to receiving the text data at the timing T3, the communication terminal 200A-2 displays the text data in the time period K34 from the timing T3 to the timing T4.

During the time period K34, the content data is still being reproduced. In the example of FIG. 12, the communication terminal 200A-2 finishes reproducing the content data including the edited audio data at a timing T5. In other words, the reproduction time of the content data including the edited audio data is a time period K15 from the timing T1 to the timing T5.

Therefore, according to the present embodiment, the time period K34 during which the text data is displayed is included within the time period K15, which is the reproduction time of the content data including the edited audio data.

As described heretofore, in the present embodiment, by extending audio data (content data), it is possible to display text data, which is a speech recognition result of the audio data during the reproduction of the audio data.

According to embodiments of the present disclosure, it is possible to correspond audio data being reproduced and the text data being displayed.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A communication terminal comprising:
   circuitry configured to receive audio data collected by an audio collecting device;
   transmit the audio data to a speech recognition apparatus via a network;
   receive text data, which is a result of speech recognition of the audio data, from the speech recognition apparatus;
   reproduce the audio data; and
   display the text data on a display device during a period in which the audio data is being reproduced, wherein the circuitry:
   determines whether a time period from when the reception of the audio data is started until when the text data is received is longer than a predetermined period of time; and
   based on a determination that the time period from when the reception of the audio data is started until when the text data is received is longer than the predetermined period of time, edits the audio data to lengthen a reproduction time of the audio data;
   wherein in editing the audio data, the circuitry edits the audio data so that the reproduction time of the edited audio data is longer than the time period from when the reception of the audio data is started until when the text data is received;
   in reproducing the audio data and displaying the text data, the circuitry displays the text data on the display device during a period in which the edited audio data is reproduced; and
   wherein the predetermined period of time is an average of a plurality of time periods from when the reception of audio data is started until when the text data is received.

2. The communication terminal of claim 1, wherein
   the circuitry buffers the received audio data, during a period from when a reception of the audio data is started until when a reception of the text data is finished, and
   in reproducing the audio data and displaying the text data, the circuitry starts reproduction of the audio data and display of the text data at the same time, after finishing receiving the text data.

3. The communication terminal of claim 1, wherein
   the audio data is contained in content data that includes at least one of image data of an image displayed on the display device and stroke information indicating at least one of a character and an image that is input to the display device.

4. A communication method performed by a communication terminal, the method comprising:
   receiving audio data collected by an audio collecting device;
   transmitting the audio data to a speech recognition apparatus via a network;
   receiving text data, which is a result of speech recognition of the audio data, from the speech recognition apparatus;
   determining whether a time period from when the reception of the audio data is started until when the text data is received is longer than a predetermined period of time;
   based on a determination that the time period from when the reception of the audio data is started until when the text data is received is longer than the predetermined period of time, editing the audio data to lengthen a reproduction time of the audio data;
   reproducing the audio data;
   displaying the text data on a display device during a period in which the audio data is being reproduced;
   wherein the audio is edited data so that the reproduction time of the edited audio data is longer than the time period from when the reception of the audio data is started until when the text data is received;
   in reproducing the audio data and displaying the text data, the text data is displayed on the display device during a period in which the edited audio data is reproduced; and
   wherein the predetermined period of time is an average of a plurality of time periods from when the reception of audio data is started until when the text data is received.

5. A computer program product embedded on a non-transitory computer readable medium comprising:
   a first code segment executable to receive audio data collected by an audio collecting device;
   a second code segment executable to transmit the audio data to a speech recognition apparatus;
   a third code segment executable to receive text data, which is a result of speech recognition of the audio data, from the speech recognition apparatus;
   a fourth code segment executable to determine whether a time period from when the reception of the audio data is started until when the text data is received is longer than a predetermined period of time;
   a fifth code segment executable to determine that when the time period from when the reception of the audio data is started until when the text data is received is longer than the predetermined period of time, edit the audio data to lengthen a reproduction time of the audio data;
   a sixth code segment executable to reproduce the audio data;
   a seventh code segment executable to display the text data on a display device during a period in which the audio data is being reproduced;
   an eight code segment executable to reproduce the audio is edited data so that the reproduction time of the edited audio data is longer than the time period from when the reception of the audio data is started until when the text data is received;
   a ninth code segment executable to reproduce the audio data and display the text data, the text data is displayed on the display device during a period in which the edited audio data is reproduced; and
   a tenth segment executable wherein the predetermined period of time is an average of a plurality of time periods from when the reception of audio data is started until when the text data is received.

* * * * *